United States Patent [19]

Heuwieser et al.

[11] 4,299,126
[45] Nov. 10, 1981

[54] DEVICE FOR MEASURING THE LEVEL OF A LIQUID IN A CONTAINER

[75] Inventors: Erwin Heuwieser, Haar; Johann Kammermaier, Unterhaching; Peter Roedl, Rosenheim, all of Fed. Rep. of Germany

[73] Assignee: Siemens Aktiengesellschaft, Berlin & Munich, Fed. Rep. of Germany

[21] Appl. No.: 75,670

[22] Filed: Sep. 13, 1979

[30] Foreign Application Priority Data

Sep. 26, 1978 [DE] Fed. Rep. of Germany ....... 2841889
Nov. 13, 1978 [DE] Fed. Rep. of Germany ....... 2849143

[51] Int. Cl.$^3$ .............................................. G01F 23/24
[52] U.S. Cl. .................................................. 73/295
[58] Field of Search ......................... 73/295, 292, 342; 338/28; 324/65 P

[56] References Cited

U.S. PATENT DOCUMENTS 3,485,100 12/1969 Petersen ................................ 73/295
3,921,450 11/1975 Pfister ................................... 73/295

FOREIGN PATENT DOCUMENTS 622247 5/1927 France .................................. 73/295
271708 6/1927 United Kingdom ................. 73/295

Primary Examiner—Gerald Goldberg
Assistant Examiner—Denis E. Corr
Attorney, Agent, or Firm—Hill, Van Santen, Steadman, Chiara & Simpson

[57] ABSTRACT

A device for measuring the fill level in a container at least partially filled with a liquid, particularly for determining the liquid level in a fuel tank, in which a measuring resistor, comprising a metallic resistance layer having a great temperature coefficient of the specific resistance is carried by a carrier foil. The portion of the resistance layer disposed in the liquid remains cold, while that portion above the liquid is at a higher temperature, whereby the difference between the present resistance and that of an empty tank is proportional to the fill level within the tank. The change of resistance preferably is measured in connection with that of a comparator resistor which is not heated and compensates for temperature influence etc. An influence on the measurement due to convection in the fuel tank is prevented by means of covering sheets which are spaced a small distance from the resistors by means of suitable spacing strips.

20 Claims, 4 Drawing Figures

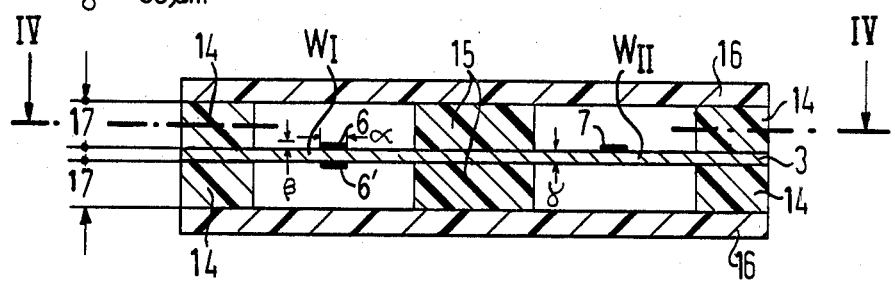
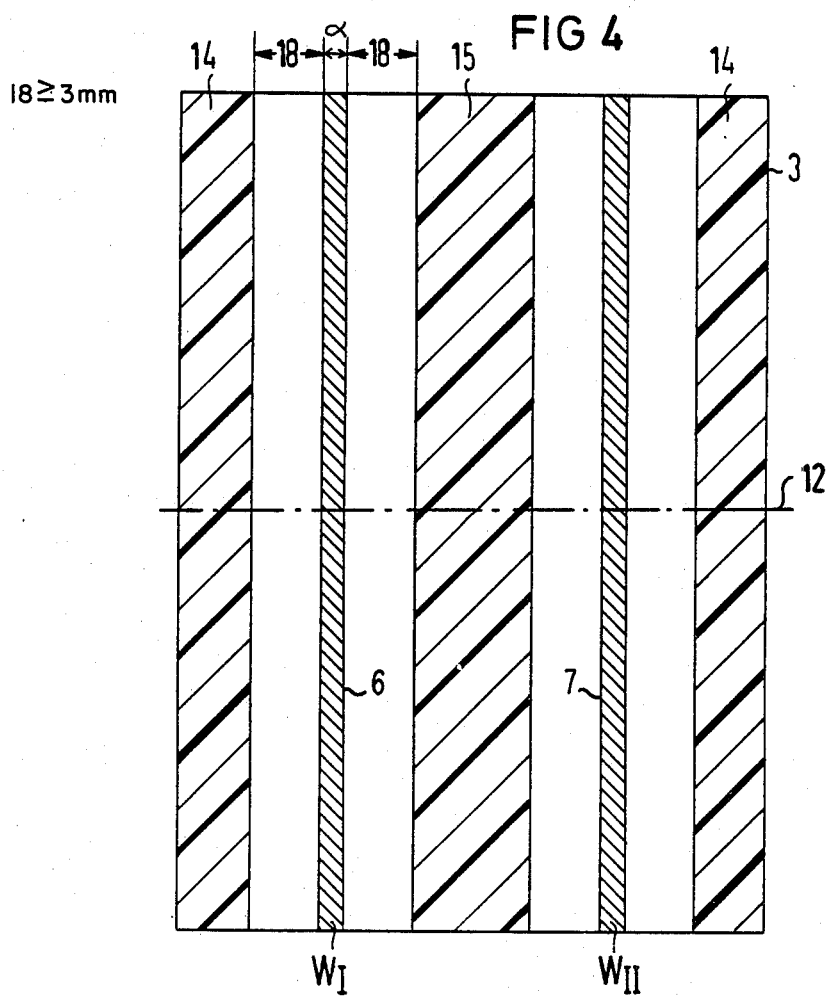

DEVICE FOR MEASURING THE LEVEL OF A LIQUID IN A CONTAINER

BACKGROUND OF THE INVENTION

The invention relates to a device for measuring the level of liquid in a container, particularly a fuel tank or the like, which contains a temperature-dependent electric resistor which is adapted to be heated by a suitable means and utilizes a measuring device which indicates changes in the resistance value as a result of change in the fill level of the liquid.

A measuring device for reading liquid levels is known from German AS No. 23 08 823, in which is disclosed a plurality of sheath conductors, of which one part includes resistance wires and heat conductors carrying current, and another part contains only resistance wires wound on a carrier bar. Such resistance wires are arranged in a measuring bridge circuit, whereby the temperature-dependent resistance wires of a heated sheath conductor are arranged in one bridge arm and those of an unheated sheath conductor are arranged in another bridge arm of the resistance measuring bridge. This type of measuring device for indicating the level reading, is particularly adapted for use in measuring liquid levels in nuclear reactor power plants where, as a rule, the level of water is to be measured.

Such devices, however are not suitable for the measurement of liquid levels of fuels or other readily volatile compounds. The mass of the measuring body to be heated is very large in relationship to its surface which can be contacted by the liquid. This produces not only a great inertia in the display operation and a low precision of measurement, as a result of the heat dissipation in the measuring body, but in addition a relatively high heat output must be expended because a significant temperature gradient exists within the measuring device, and only the mean temperature difference between the part of the measuring device disposed in the liquid and the part disposed outside of the liquid can be evaluated to provide a measurement. Consequently, the part disposed outside of the liquid is relatively strongly heated and can produce a vaporization of the liquid at the boundary area. This results not only in the loss of liquid due to vaporization, but also where employed in connection with combustible liquids, results in an increased danger of explosion. Moreover, as a result of the necessary heat output and the low heat conductivity of fuels, in such a measuring device, a heating occurs in the part of the resistor lying within the liquid that greatly weakens the signal.

It has also been proposed to employ the change in capacitance between two neighboring electric conductors or conductor surfaces in connection with the determination of the height of a liquid level. Such methods involve a relatively high outlay for apparatus and are susceptible to contamination during operation. Further, the influence of unavoidable supply line capacitances on the measuring result is extremely difficult to suppress.

BRIEF SUMMARY OF THE INVENTION

The present invention has among its objects, the relatively accurate measurement of the level of liquid in a container, with a minimum outlay of apparatus, a high measuring precision and with a low energy consumption. The device is suitable for the measurement of combustible, readily volatile liquids, particularly fuels for combustion engines and the like.

This objective is achieved, in accordance with the invention, in a device such as previously referred to, by the provision of a temperature-dependent resistor which is constructed of insulating carrier foil and a metal layer carried thereby, in which the layer has a specific resistance having a high temperature coefficient and in which a current source is connected to the resistor which can supply a current which is independent of the liquid level in the container, with the voltage drop at the resistor being evaluated as a measure of the liquid level.

A device in accordance with the invention has the advantage that the mass of the carrier foil can be very small and the metal layer can have a very small thickness, whereby no disruptive gradient of temperature occurs in the resistance and no disruptive transition zone exists in the area of the liquid surface as a result of the low mass of the device and its small thickness. Consequently, the measurement can be performed with a very low response time.

Preferably, the resistance layer has a ratio of width to thickness of over 100:1, thereby assuring that no disruptive temperature gradient occurs in the layer. Preferably, a synthetic foil is employed as the insulating carrier which is flexible and, therefore, is easy to handle and resistant to mechanical loads, particularly in the presence of movement of the liquid to the container. A disruptive influence of the measurement due to the thermal capacity of the carrier is avoided when the width of the resistance layer is greater than the thickness of the insulating carrier foil by a factor of at least 10. Iron or nickel are particularly suited for the material, with the resistor layer preferably being formed by a vapor-deposition, as these metals exhibit a high temperature coefficient of the specific resistance. In addition, nickel in particular is not attacked by the liquids to be measured. Resistor layers consisting of nickel and their manufacture are described, for example, in German L.P. No. 10 79 166. Iron also is stable with respect to the organic compounds of combustion engine fuels. Both of the materials, Ni and Fe, can be vapor-deposited in a very thin layer so that the resistance value can be adjusted within a wide range, even where the design involves relatively small lengths of the resistor layer, whereby a high measuring sensitivity can be achieved. It is also possible, where irregularly shaped containers are involved, to achieve a linear display in the measuring instrument by so designing the resistance layer that the width thereof is matched to the size of the liquid surface as a function of the liquid level height. Even containers which, because of their shape, do not offer sufficient space for the incorporation of the usual type of display device employing a float, can be equipped with a device in accordance with the present invention, and in such case a linear level display can also be achieved. A value for the surface resistance of a resistor layer that is favorable for employment in the gas tank of a motor vehicle amounts to 0.6 ohms per square.

Ambient temperature influences and the like can be compensated, in accordance with the present invention, by the provision of a non-heated comparator resistance connected to a current source which supplies a small current, insufficient to heat up the resistor, with the difference in the voltage drop at the measuring resistor and the voltage drop at the comparator resistor being evaluated as the measuring signal. To this end, the comparator resistor and the measuring resistor preferably are formed of metal layers disposed upon a common carrier foil. Preferably, the metal layers for both the measuring and comparator resistors are congruent and designed with the same thickness.

In accordance with the invention there is advantageously provided a circuit for controlling the current as a function of the temperature above the surface of the liquid. The air temperature $T_L$ and fuel temperature $T_B$ existing in the tank as a result of external conditions, definitely influence the measuring operation. Measuring errors resulting therefrom are to be electronically eliminated, which is accomplished by means of the parallel arrangement of a measuring resistor $W_I$ and a comparator resistor $W_{II}$. The difference $\Delta U$ between the voltage drop at $W_I$ and the voltage drop at $W_{II}$, is reciprocally amplified with respect to the currents through $W_I$ and $W_{II}$, and is evaluated as the measuring signal. Assuming a constant strip width over the entire length of the resistors $W_I$ and $W_{II}$, and assuming that the same basic temperature distribution prevails in both resistors due to external conditions and that the excess temperature $\Delta T$ created due to the heating is added thereto in the measuring resistor $W_I$ in air above the liquid, it is valid that:

$$\Delta U = JRT_{KR}(\Delta T)(L-h)$$

wherein
  $J$ = Current through the measuring resistor $W_I$
  $R$ = length-related resistance value of the two vapor-deposited resistor strips
  $T_{KR}$ = Temperature coefficient of R
  $h$ = Filling level height in tank
  $L$ = Height of tank or length of the resistor strips.

Considering the above equation, $\Delta U$ depends linearly on h; while the air temperature $T_L$ and the fuel temperature $T_B$ cancel out. Assuming a self-heating of $W_I$, the excess temperature $\Delta T$, however, is co-determined by $T_L$ and there thus is a linear relation between such magnitudes. In order to suppress the implicit influence of $T_L$ on $\Delta U$, where a self-heated sensor is involved, in which the heating of the measuring resistor is thus generated due to the current therethrough, the currents through the resistors $W_I$ and $W_{II}$ must be changed in the same ratio opposite to the temperature $T_L$. This is electronically possible with sufficient precision. Where external heating of $W_I$ is employed, i.e. heating due to a separate heat conductor, this problem does not occur since the heat supplied over a separate current conductor can be generated independently of the temperature $T_L$. In this case, the resistors $W_I$ and $W_{II}$ have the same very low currents flowing therethrough which exclude a self-heating. Currents under 1 mA are suitable for this purpose, whereas a current of approximately 40 mA is advantageous for a self-heated sensor having a width of 0.8 mm and a thickness of the nickel layer of approximately 0.15 $\mu$m. With such dimensioning, a temperature difference of approximately 15° C. is produced in the nickel vapor-deposited layers between the part of $W_I$ immersed in the liquid and the part thereof disposed above the liquid. This corresponds to a resistance change of approximately 10%. This can be further processed electronically without difficulty with the necessary precision. Thereby, a maximum of 6 volts is sufficient for the height of the voltage drop at the measuring resistor, which voltage can be readily derived from the battery circuits of a motor vehicle.

In a further development of the invention, a falsification of the measuring results due to convection in the container is eliminated. Convection occurs in the container as a result of movement, temperature differentials and temperature changes. Temperature differentials in the container are always generated due to the heating of the measuring resistor, and a convection, particularly of the gases above the surface of the liquid, produces a cooling, and, thus, an erroneous, non-constant display indication. This effect depends greatly on temperature, so that a calibration of the device and reproduceable measurement displays become questionable.

A gauge for indicating liquid levels is known, which utilizes resistance wires housed in a tube in order to avoid convection influences. However, such a construction is relatively expensive as the tube must exhibit considerable rigidity in order to withstand the movements of the liquid in the fuel tank. A bending of the tube would undoubtedly lead to damage to or the destruction of the device. In addition, a tube can hardly be employed for a filling level gauge as here involved, as a significant volume must remain free in front of or behind the relatively wide carrier in the tube, if the tube is to have the required stability. A heat source in the form of a heated measuring resistor is disposed in this volume, which in turn renders possible a convection which is produced by the heated measuring resistors, so that the desired effect is not achieved.

In accordance with the invention, these disadvantages are avoided by the disposition of a covering sheet adjacent to and spaced from the metal layer by a short distance, which covering foil is in contact with spacing strips adjacent to the metal layer at the side thereof, and which are in contact with the carrier foil, and extend in the axial direction of the metal layer to form a passageway which is open at its opposite ends. This construction has the advantage that the carrier foil, its spacing strips and the covering sheet are flexible, i.e. no buckling of the device can ensue as a result of movement of the liquid in the container, and that the present spacing between the carrier foil and the covering sheet is nonetheless assured as a result of the specific arrangement of the spacing strips. A further advantage is that the distance between the carrier foil and covering sheet can readily be corrected without difficulty by suitable selection of the thickness of the spacing strips.

Where the measuring resistor and a comparator resistor in the form of a metal layer, congruent to the metal layer of the measuring resistor, are disposed upon a common carrier, preferably a common covering sheet may be utilized for both metal layers and a spacing strip may be provided which extends between and parallel to the two metal layers and contacts both the carrier foil and the covering sheet. As a result, the free span of the covering foil between the supporting surfaces is kept short and by so doing, a thermal separation between the measuring resistor and the comparator resistor is achieved so that the two resistors can be arranged relatively closely adjacent one another without having them mutually influence one another.

Preferably, the covering sheet is a synthetic sheet or foil. The spacing strips are preferably suitably bonded to the covering sheet and the carrier foil, which can be accomplished, for example, by a lamination of the respective members by means of a suitable adhesive. This construction provides the advantage of a high stability whereby the individual carrier foil and covering sheet can be relatively thin.

The embodiments thus far described are particularly suited for fabrication with a carrier of low thermal conductivity, however, if thin foils, which have good thermal conductivity, are to be employed as carriers, it is preferable that the covering sheet and covering strips be arranged mirror-symmetrically with respect to the carrier foil on opposite sides of the latter, whereby a convection is avoided on both sides of the carrier foil.

In order to avoid a convection between the covering sheet and the carrier foil, it is preferable that the spacing therebetween be less than 5 mm. It has been found that a particularly advantageous spacing is between approximately 1 mm and 2 mm. With such a construction, a convection between the carrier foil and the covering sheet is avoided and at the same time the spacing is not so small that a disruptive capillary effect is produced.

Preferably, the carrier foil is 50 μm thick, in order to assure the necessary stability. A carrier foil of such thickness also can withstand the thermal load occurring during the vacuum-deposition of the relatively, for example, 0.2 μm, thick resistor metal layers without damage or change of form. Even where direct heating and a relatively narrow resistor layer of approximately 0.5 mm width and correspondingly low current strengths, for example less than 40 mA, are utilized a sensor with a low thermal inertia is achieved. If a carrier foil of 50 μm thick from polyimide is employed, it is preferable to leave a free minimum spacing of 3 mm between the edges of the resistor layers and the respective neighboring spacing strips in order to avoid the creation of a disruptive heat sink for the resistor layer.

Preferably, the spacing strips and the covering sheet are fabricated as a single unitary structure to which the carrier foil is suitably bonded. The covering sheet and the spacing strips connected thereto preferably are constructed of polyamide by a suitable extrusion or drawing operation. Instead of polyamide, other thermal plastics, particularly polyacetate, polyethylene terephthalate, polybutylene terephthalate, polyarylsulfate or fluoropolymers can also be utilized. For this purpose polychlortrifluoroethylene (PCT FE), copolimerizate of tetrafluoroethylene (PFEP), polyvinylidenfluoride (PVDF) and polyvinylfluoride (PVF) are particularly suitable for this purpose.

In a construction involving individual parts, such parts may consist of the same or different materials, for example of epoxy resin, glass fiber webs, laminated plastics, duroplastics, thermoplastics, etc. The other substances stated above are also suitable for this purpose as thermoplastics. The embodiment described, with the employment of polyamides, has particularly favorable mechanical properties, particularly a high flectional elasticity and is resistant to fuels, etc.

BRIEF DESCRIPTION OF THE DRAWINGS

In the drawings wherein like reference characters indicate like or corresponding parts:

FIG. 3 is a transverse sectional view illustrating the physical construction of an embodiment such as illustrated in FIG. 2; and FIG. 4 is a sectional view taken approximately on the line IV—IV of FIG. 3.

DETAILED DESCRIPTION OF THE INVENTION

Figure 1:
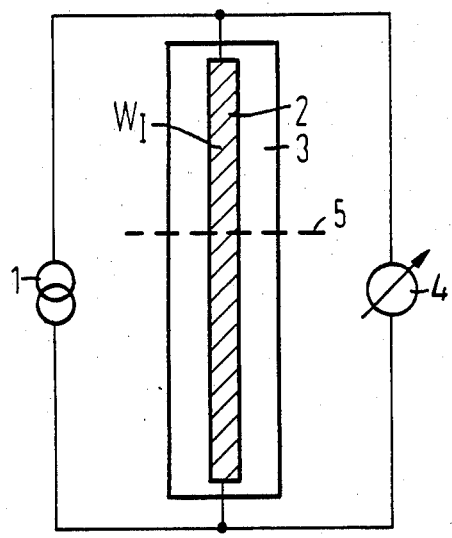
FIG. 1 is a schematic view of a illustrative embodiment of the invention utilizing only a measuring resistor.

Referring to the drawings and more particularly to FIG. 1, the reference numeral 1 designates a current source, the current of which is independent of liquid level. A measuring resistor $W_I$ comprises a metal layer 2 (illustrated by shading) which is disposed on insulating carrier foil 3. The measuring resistor $W_I$ is immersed in a liquid, the surface of which is designated by the numeral 5. The portion of the metal layer 2 disposed above the surface of the liquid 5 heats up to a significantly greater extent than the portion below the liquid surface. A suitable measuring device 4 measures the voltage drop at the measuring resistor $W_I$.

Figure 2:
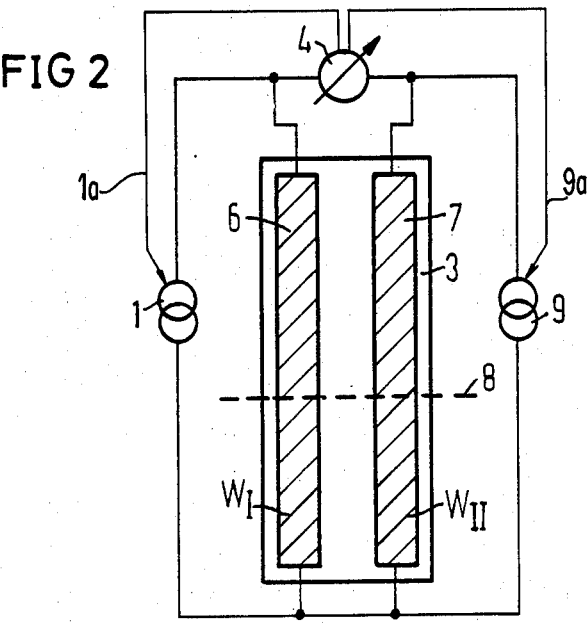
FIG. 2 is a similar view of another embodiment of the invention employing a measuring resistor and a comparator resistor.

The embodiment of FIG. 2 illustrates the provision of a temperature compensation. In this construction, a measuring resistor $W_I$ is formed from a metal layer 6 disposed on the carrier foil 3 and, in addition, a comparator resistor $W_{II}$ is formed by a congruent metal layer 7, illustrated by shading, which is disposed on the same carrier foil 3. A constant current source 1 supplies a current flow through the measuring resistor $W_I$ which is sufficient for heating the portion thereof disposed above the surface of the liquid 8. A second constant current source 9 similarly supplies a current flow that is independent of the liquid level through the comparator resistor $W_{II}$, which current is insufficient to produce a disruptive heating of the comparator resistor $W_{II}$. A measuring instrument 4 measures the difference between the voltage drop at $W_I$ and the voltage drop at $W_{II}$, amplified in the ratio of the current through $W_I$ to the current through $W_{II}$. A sufficient differential of these voltage drops is achieved, for example, with a congruent design of the resistors $W_I$ and $W_{II}$, when the current through the measuring resistor $W_I$ is greater than the current through the comparator resistor $W_{II}$ by a factor of 10. In this case, a ratio of the corresponding output of 100:1 results.

The measuring resistor $W_I$ also can be indirectly heated in which case a metal layer, preferably a congruent metal layer with the smallest possible temperature coefficient of the resistance value is mounted in congruent relation with the measuring resistor $W_I$, separated from the latter by means of an insulating layer. For example, the metal layer can be applied on the back side of the carrier foil 3, as indicated by the reference numeral 6' in FIG. 3. In this case only minimum measuring currents are sent through both the measuring resistor $W_I$ and the comparator resistor $W_{II}$. The heating resistor 6' may then be supplied by a current flow sufficient to provide the desired heating, which current flow likewise is independent of the liquid level height.

The current sources 1 and 9 may have any means such as are well known in the art for controlling the respective currents therefrom as a function of the temperature of the air above the liquid, such as feedback loops 1a and 9a.

Where the liquids to be measured are not electrically conductive, the resistor layers can be exposed. If, however, liquids having an interfering electric conductivity are to be measured, suitable electrically insulating layers may be applied to the resistor layers, for example, such insulating layers can be suitably lacquered on otherwise applied thereto.

FIGS. 3 and 4 illustrate a physical structure for protection against heat losses resulting from convection. As in the embodiment illustrated in FIG. 2, that of FIGS. 3 and 4 utilizes a measuring resistor $W_I$ and a comparator resistor $W_{II}$ which are carried on a common carrier foil 3 in the form of two congruent metal layers 6 and 7. The measuring resistor $W_I$ and the comparator resistor $W_{II}$ are circuited in series with respective current sources (not shown) corresponding to the current sources 1 and 9, which supply respective currents independent of the filling level heights, with a relatively high current heating the measuring resistor $W_I$ in the area over the liquid surface 12. Below the liquid surface 12 the measuring resistor is cooled due to the higher heat conductivity of the liquid, so that no measurable heating there occurs. A current which is independent of the filling level and is of low current strength flows through the comparator resistor $W_{II}$, and is insufficient to heat the latter to a measureable degree. A measuring instrument, such as the instrument 4, measures the difference between the voltage drop off at the measuring resistor $W_I$ and the voltage drop at the comparator resistor $W_{II}$ which is multiplied by the ratio of the current through the measuring resistor $W_I$ to the current through the comparator resistor $W_{II}$, with such difference representing the desired liquid level measurement.

As also shown in FIG. 3 the metal layer 6 has a width $\alpha$ and a thickness $\beta$ selected such that $\alpha/\beta$ is greater than 100. The width $\alpha$ may be, for example, approximately 0.5 mm.

It will be appreciated that in a liquid level gauge such as illustrated in FIG. 1, the portion of the measuring resistor $W_I$ lying above the surface of the liquid would be non-uniformly cooled in the presence of temperature fluctuations due to convections in the gas. This cooling effect would increase with the temperature, and the measuring result would include a significant error. In order to achieve a reproduceable indication even in the presence of temperature fluctuations, both the measuring resistor $W_I$ as well as the comparator resistor $W_{II}$ are protected by means of covering sheets 16 which are spaced at a desired interval 17 from the carrier foil 3 or the respective resistors $W_I$ and $W_{II}$ by means of spacing strips 14 and 15. The spacing strips 15 also serve as a heat brake in that they prevent, to a large degree, a heat conduction from the measuring resistor $W_I$ to the comparator resistor $W_{II}$, and by so doing, the spacing between the measuring resistor $W_I$ and the comparator resistor $W_{II}$ can be made relatively short. A minimum interval 18 is provided between the measuring resistor $W_I$ and the adjacent strips 14 or 15, in order to avoid a possible erroneous measurement due to heat conduction within the carrier foil 3.

Insofar as the carrier foil 3 achieves a desired heat insulation, the covering sheet 16 and the cooperable spacing strips 14 and 15 can be omitted on the side of the carrier foil 3 opposite to that carrying the resistors $W_I$ and $W_{II}$. In the event the current through the comparator resistor $W_{II}$ is maintained appropriately small, it is sufficient that the covering sheet 16 covers only the measuring resistor $W_I$ but not the comparator resistor $W_{II}$. The interval 17 is less than 5 mm preferably amounts to 1 mm to 2 mm in order to avoid a convection between the covering sheet 16 and the carrier foil 3 but is sufficiently large so as not to produce a disruptive capillary effect. Assuming a carrier foil comprising a polyimide having a thickness $\alpha$ of 50 $\mu$m, the interval 18 amounts, for example to at least 3 mm in order to avoid an influencing of the measuring results due to heat dissipation over the carrier foil 3.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim as our invention:

1. In a sensing device for measuring the fill level in a container at least partially filled with a liquid, particularly in a fuel tank, which includes a temperature-dependent electric resistor, means for heating the resistor, and a measuring device which indicates changes in the resistance value of the resistor due to change in the filling level of the liquid, the improvement of: said temperature-dependent resistor comprising an insulating carrier foil and a metal layer thereon, said metal layer having a specific resistance with a high temperature coefficient, said metal layer having a width which is at least 10 times greater than a thickness of said carrier foil, and said means for heating the resistor including a current source connected to said resistor, which current source supplies an electric current which is independent of the liquid level, a cover sheet extending in spaced relation relative to said carrier foil at the side thereof carrying the metal layer of said temperature-dependent resistor, spacing strips extending in the axial direction of said metal layer and connecting said foil and cover sheet at opposite sides of and laterally spaced from the metal layer of said temperature-dependent resistor forming a passageway having an open end adjacent to each end of the metal layer of said measuring resistor, and said measuring device including means for measuring the voltage drop at said resistor as an evaluation of the liquid level.

2. The improvement of claim 1, wherein the metal layer exhibits a ratio of said width to a thickness of said metal layer of more than 100:1.

3. The improvement of claim 1, wherein said insulating carrier comprises a synthetic foil.

4. The improvement of claim 1, wherein the metal layer is comprised of iron.

5. The improvement of claim 1, wherein the surface resistance of the metal layer exhibits approximately 0.6 ohm per square.

6. The improvement of claim 1, comprising in further combination a non-heated comparator resistor which is connected to a current source for supplying a current which is sufficiently small that it does not heat said comparator resistor, said measuring means being connected for measuring the difference between the voltage drop at the temperature-dependent resistor and the voltage drop at the comparator resistor, amplified in the ratio of the current through the measuring resistor to the current through the comparator resistor, as an evaluation of the liquid level.

7. The improvement of claim 6, wherein both the comparator resistor and the temperature-dependent resistor are formed of metal layers disposed on a common carrier foil.

8. The improvement of claim 7, wherein the respective metal layers of the temperature-dependent and comparator resistors are of the same thickness and material, and are congruent in configuration.

9. The improvement of claim 1, comprising in further combination, electronic circuit means for each current source for controlling the current in said resistors as a function of the temperature of the air above the surface of the liquid.

10. The improvement of claim 1, comprising in further combination, means for separately heating the temperature-dependent resistor independently of the current flow therethrough, said current source supplying a measuring current to said temperature-dependent resistor having a sufficiently low level such that said measuring current will not heat up said resistor.

11. The improvement of claim 1 comprising in further combination a comparator resistor in the form of a metal layer congruent with the metal layer of the temperature-dependent resistor and arranged on a common carrier foil therewith and extending in the same direction as the temperature-dependent resistor, the metal layer of said comparator resistor being disposed adjacent one of said spacing strips, and an additional spacing strip laterally disposed adjacent the opposite side of said comparator resistor, said covering sheet extending across both metal layers with the additional spacing strip being connected to the carrier foil and said cover sheet, the spacing strip disposed between said metal layers extending parallel thereto.

12. The improvement of claim 1 comprising in further combination, a further cover sheet and additional spacing strips disposed at the opposite side of said carrier foil with the respective covering sheets and spacing strips being disposed in mirror-symmetric relation with respect to the carrier foil.

13. The improvement of claim 8, comprising in further combination, a cover sheet extending in spaced relation relative to said carrier foil at the side thereof carrying the metal layer of said temperature-dependent resistor, spacing strips extending in the axial direction of said metal layer and connecting said foil and cover sheet at opposite sides of and laterally spaced from the metal layer of said temperature-dependent resistor, to form a passageway having an open end adjacent each end of the metal layer of said temperature-dependent resistor.

14. The improvement of claim 13, comprising in further combination a comparator resistor in the form of a metal layer congruent with the metal layer of the temperature-dependent resistor and arranged on a common carrier foil therewith and extending in the same direction as the temperature-dependent resistor, the metal layer of said comparator resistor being disposed adjacent one of said spacing strips, and an additional spacing strip laterally disposed adjacent the opposite side of said comparator resistor, said covering sheet extending across both metal layers with the additional spacing strip being connected to the carrier foil and said cover sheet, the spacing strip disposed between said metal layers extending parallel thereto.

15. The improvement of claim 14, comprising in further combination, a further cover sheet and additional spacing strips disposed at the opposite side of said carrier foil with the respective covering sheets and spacing strips being disposed in mirror-symmetric relation with respect to the carrier foil.

16. The improvement of claim 1, wherein the spacing between the covering sheet and the carrier foil is less than 5 mm.

17. The improvement of claim 1, wherein the spacing between the covering sheet and the carrier foil is in the range of 1 mm to 2 mm.

18. The improvement of claim 1, wherein the metal layer of the temperature-dependent resistor is approximately 0.5 mm wide and the current supply means therefor provides a current of not more than 40 mA.

19. The improvement of claim 1, wherein the carrier foil is 50 $\mu$m thick and comprises polyimide and that a minimum spacing of 3 mm exists between the edges of the metal layer of the temperature-dependent resistor and the respective adjacent spacing strips.

20. The improvement of claim 1, wherein said covering sheet and associated spacing strips are formed as a single unitary member which is bonded to said carrier foil.

* * * * *